March 3, 1953
G. HERZOG
2,630,511
ELECTRICAL ANALOGUE
Filed Jan. 30, 1951
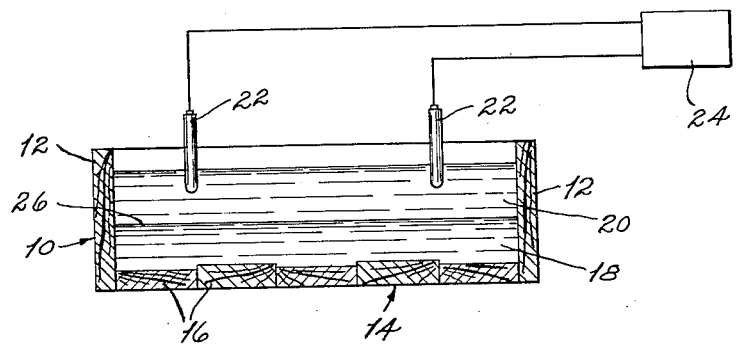
INVENTOR.
GERHARD HERZOG
BY
ATTORNEYS

Patented Mar. 3, 1953

2,630,511

UNITED STATES PATENT OFFICE 2,630,511

ELECTRICAL ANALOGUE

Gerhard Herzog, Houston, Tex., assignor to The Texas Company, New York, N. Y., a corporation of Delaware Application January 30, 1951, Serial No. 208,620

7 Claims. (Cl. 201—57)

This invention relates to a method and an apparatus for use in the making of electrical analogues i. e., the analyses of mechanical and electrical systems which obey Laplace's equation, and provides improvements which facilitate the solution of many problems in hydraulics, electrical flow in conductors, the electro-magnetic fields of electrical discharge devices such as vacuum tubes, radiation detectors and the like.

In the pending application of B. D. Lee, Serial No. 788,989, filed December 1, 1947, now Patent No. 2,569,816, issued October 2, 1951, for Electrical Analogues, equipment is disclosed by which problems relating to the abovementioned fields may be solved. A model is usually made up in which a pool of electrolyte corresponds in shape to a section of the device to be studied and electrical potentials corresponding in magnitude and location to field forces acting upon the device to be studied are imposed across the pool. The pool is then explored with one or more electrodes at a plurality of points so as to determine the potentials at these points. In the case of an electrical condenser or a radiation detector, for example, these potentials serve as a guide to the distribution of field forces to be expected in the proposed device.

In some of the electrical model studies the pool of electrolyte is three dimensional i. e., the model may have vertical side walls and an irregular or a sloping lower boundary or floor. In some studies, however, it is desirable to use a two dimensional model in which electrodes are adapted to be inserted or suspended in a layer of a conducting fluid or electrolyte of uniform thickness. It has been found that under certain conditions the results obtained are quite critical as to the thickness of the fluid layer. Thus, if in critical regions the layer of electrolyte is even slightly thinner or thicker than at the others erroneous results may be obtained. In the past it has been the practice to construct the model from a material such as wood which may be coated with paraffin. Into this trough or tank the electrolyte is filled to the desired depth. Even though great care is taken to provide a smooth horizontal bottom for the electrolyte it frequently occurs that due to warpage or other reasons the floor of the pool is not always smooth and horizontally disposed. In these cases the pool will not have a perfectly uniform thickness.

In accordance with this invention a layer of a fluid which is immiscible with and has a density in excess of that of the electrolyte and also a high electrical resistivity as compared to the electrolyte is placed in the model and the electrolyte is then placed on top of the heavier fluid. Regardless of irregularities in the bottom wall or floor of the model the upper surface of the heavier fluid will be smooth and horizontal and the thickness of the superimposed layer of electrolyte will be absolutely uniform.

For a better understanding of the invention reference may be had to the accompanying drawing in which the single figure is a vertical sectional elevation through a trough or model with two layers of liquid therein.

Referring to the drawing a model 10 is shown as having been constructed of side walls 12 and a bottom wall 14 formed of boards or wooden pieces 16. It is understood that the side walls of the model will be shaped in accordance with predetermined dimensions and other factors peculiar to the subject being investigated. The interior surface of the model may, if desired, be liquid proofed in any suitable manner such as by coating with paint, paraffin, and the like.

As shown in the drawing the bottom elements 16 forming the floor of the model are of varying thicknesses. A quantity of a liquid 18 is placed in the model, sufficient of the liquid being used so that there will always be some of the liquid above the highest irregularities in the model floor. The electrolyte 20 is then placed on top of the liquid 18 and one or more electrodes 22 may be suspended at the proper locations in the electrolyte and connected electrically to any suitable measuring device such as that indicated at 24.

The lower liquid 18 must be immiscible with and have a greater density than the electrolyte 20 and it should also have a high electrical resistivity as compared to that of the electrolyte. As an example, the electrolyte 20 may comprise an aqueous solution of copper sulphate and the lower liquid 18 may be carbon tetrachloride.

It will be observed that regardless of smoothness and level of the floor 14, the interface 26 which comprises the actual floor of the electrolyte pool 20 will, when the liquids are at rest, be perfectly smooth and horizontal and the vertical thickness of the pool 20 will be uniform throughout. It will also be observed that with the provision of the liquid layer 18, the floor 14 of the model does not need to be even approximately horizontal but may slope in any or all directions.

Obviously many modifications and variations of the invention, as hereinbefore set forth, may be made without departing from the spirit and scope thereof and, therefore, only such limitations should be imposed as are indicated in the appended claims.

I claim:

1. In the process of making an electrical analogue in which exploring electrodes are to be moved about in a pool of electrolyte, the method of maintaining uniform vertical thickness of said electrolyte which comprises supporting the electrolyte on a liquid immiscible therewith, which has a density greater than the electrolyte and a resistivity which is high as compared to the resistivity of said electrolyte.

2. In the process of making an electrical analogue in which exploring electrodes are to be moved about in a pool of electrolyte, the method of providing a smooth horizontal floor for said electrolyte pool which comprises floating the electrolyte on a liquid which is immiscible with the electrolyte, which has a density greater than the electrolyte and a resistivity which is high as compared to the resistivity of said electrolyte.

3. The method according to claim 2 in which the supporting liquid is carbon tetrachloride.

4. The method according to claim 2 in which the electrolyte is an aqueous solution of copper sulfate and the supporting liquid is carbon tetrachloride.

5. An apparatus for use in making electrical analogues comprising a trough having side and bottom walls, a pool of electrolyte in said trough in which pool exploring electrodes may be suspended, and means providing a smooth horizontal floor for said electrolyte comprising a body of liquid having greater density than the electrolyte and disposed between the electrolyte and the bottom wall of the trough, said liquid being immiscible with the electrolyte and having high electrical resistivity as compared to said electrolyte.

6. An apparatus as described in claim 5 in which the denser liquid is carbon tetrachloride.

7. An apparatus as described in claim 5 in which the denser liquid is corbon tetrachloride and the electrolyte is a water solution of copper sulphate.

GERHARD HERZOG.

REFERENCES CITED

The following references are of record in the file of this patent:

UNITED STATES PATENTS

| Number | Name | Date |
| --- | --- | --- |
| 2,423,754 | Bruce | July 8, 1947 |